July 3, 1934. C. SCHWOERER 1,965,433
SPRING SUSPENSION FOR MOTOR VEHICLES
Filed Feb. 4, 1931
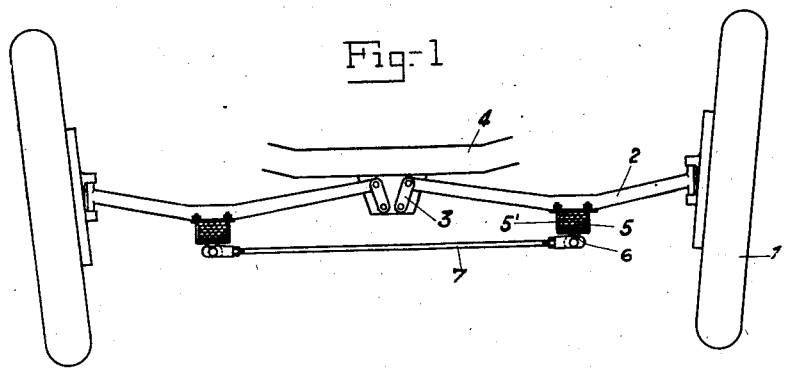
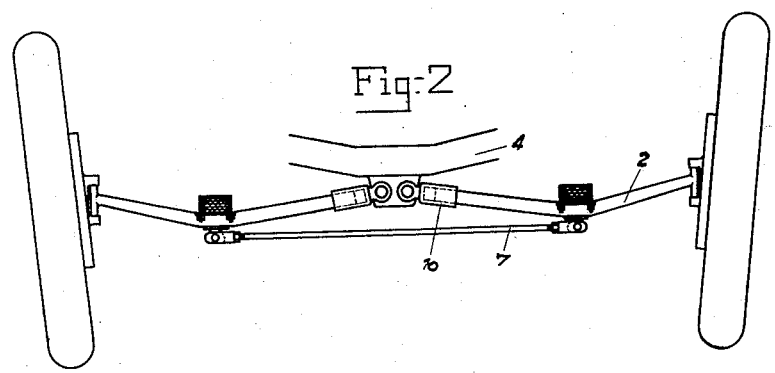
Inventor:
Ch. Schwoerer Patented July 3, 1934

1,965,433

UNITED STATES PATENT OFFICE 1,965,433

SPRING SUSPENSION FOR MOTOR VEHICLES

Charles Schwoerer, Strasbourg, France

Application February 4, 1931, Serial No. 513,344
In Germany February 5, 1930

3 Claims. (Cl. 280—124)

The present invention relates to a spring suspension for motor vehicles the wheels of which are arranged on half-axles cushioned relative to the frame by means of longitudinal leaf springs.

The spring suspension according to the invention is of a type permitting each wheel, if normal longitudinal leaf springs are used, to compensate, independently of the adjacent wheel, shocks and vibrations due to driving by giving way upwardly without causing a variation in gage, which is unavoidable in other types fitted with axles swinging about a fixed point.

According to the invention, the half-axles of opposite wheels are articulated to each other by means of a rod underneath and guided above, on the longitudinal central plane of the vehicle, so as to be movable relative to one another.

This arrangement brings it about that shocks acting from below on the wheel cause an upward displacement of the axle and a swinging motion of the jointed rod about the link-pin of the adjacent axle.

Several embodiments of the invention are illustrated in the accompanying drawing by diagrams.

Fig. 1 is a front view of the first embodiment.
Fig. 2 is a similar view of the second embodiment.

According to Fig. 1, each of the two steering wheels 1 is carried by the half-axle 2 which is connected with the cross-member 4 of the frame by means of the link-strap 3. The half-axles rest on the longitudinal leaf springs 5, the spring clips 5' of which simultaneously hold the two downwardly directed bearing supports 6 connected with one another by the rod 7.

This arrangement completely prevents the wheels from giving way laterally under shocks, the necessary compensation of motion being effected by the rod 7 connected with the wheel or its axle and being swung about the link-pin of the bearing support 6 of the adjacent axle.

According to Fig. 2, the half-axle 2 is connected with the frame 4 instead of by the link-straps 3 by means of plain sliding guides 10 articulated to the frame 4 and acting in about the same way as the straps 3. At any rate, the rod 7 prevents lateral motion of the wheel in case of shocks and jolts. In this modification the leaf springs 5 are disposed on the half-axles 2.

I claim:

1. In a spring suspension for motor vehicles comprising a pair of longitudinal leaf springs secured at their ends to the vehicle frame, a pair of ground wheels, individual axles for said wheels, each axle extending from the wheel to the longitudinal axis of the vehicle and connected to the spring intermediate its length, means connecting the inner end of each axle to the frame for limited lateral movement relative thereto, and a rod beneath the axles pivotally connecting said axles by articulation.

2. In a spring suspension for motor vehicles comprising a pair of longitudinal leaf springs secured at their ends to the vehicle frame, a couple of wheels, separate axles for the wheels, each extending from the wheel to the longitudinal axis of the vehicle and connected to the spring and slidably connected at its inner end to the frame and a rod beneath the axles pivotally connecting said axles by articulation.

3. In a spring suspension for motor vehicles comprising a pair of longitudinal leaf springs secured at their ends to the vehicle frame, a couple of wheels, separate axles for the wheels, each extending from the wheel to the longitudinal axis of the vehicle and connected to the springs and the frame, links for articulating the inner axle ends to the frame of the vehicle, a rod beneath the axles pivotally connecting said axles by articulation.

CHARLES SCHWOERER.